(12) United States Patent
Tanaka

(10) Patent No.: US 10,185,366 B2
(45) Date of Patent: Jan. 22, 2019

(54) ELECTRONIC DEVICE

(71) Applicant: KYOCERA CORPORATION, Kyoto (JP)

(72) Inventor: Junji Tanaka, Shijonawate (JP)

(73) Assignee: KYOCERA CORPORATION, Kyoto (JP)

(*) Notice: Subject to any disclaimer, the term of this patent is extended or adjusted under 35 U.S.C. 154(b) by 0 days.

(21) Appl. No.: 15/683,642

(22) Filed: Aug. 22, 2017

(65) Prior Publication Data
US 2018/0059732 A1 Mar. 1, 2018

(30) Foreign Application Priority Data
Aug. 26, 2016 (JP) .................... 2016-165719

(51) Int. Cl.
G06F 1/16 (2006.01)
H04M 1/03 (2006.01)

(52) U.S. Cl.
CPC .......... *G06F 1/1656* (2013.01); *H04M 1/035* (2013.01)

(58) Field of Classification Search
CPC ..... G06F 1/1656; G06F 1/1626; H04M 1/035
See application file for complete search history.

(56) References Cited

U.S. PATENT DOCUMENTS

| | | | | |
|---|---|---|---|---|
| 6,763,110 B1* | 7/2004 | Sung | .................... | H04M 1/0202 379/433.02 |
| 9,795,044 B2* | 10/2017 | Lai | ...................... | H05K 5/0086 |
| 9,843,659 B2* | 12/2017 | Yamaguchi | ........... | H04M 1/035 |
| 9,882,596 B2* | 1/2018 | Flores | ................... | H04B 1/3888 |
| 9,886,089 B2* | 2/2018 | Park | ........................ | G06F 3/016 |
| 2011/0195745 A1* | 8/2011 | Inoda | .................... | H04M 1/035 455/550.1 |
| 2014/0004913 A1* | 1/2014 | Kimura | ................. | H04M 1/035 455/575.1 |
| 2014/0167365 A1* | 6/2014 | Chu | ....................... | F16J 15/025 277/590 |
| 2015/0027802 A1* | 1/2015 | Altschul | ................ | A45C 11/00 181/177 |
| 2015/0241627 A1* | 8/2015 | Farnsworth | .............. | G02B 6/00 362/581 |
| 2016/0306399 A1* | 10/2016 | Koppal | .................... | G06F 1/182 |
| 2017/0085687 A1* | 3/2017 | Fernandes | ........... | H04M 1/0254 |
| 2017/0108897 A1* | 4/2017 | Choi | ..................... | G06F 1/1656 |
| 2017/0157573 A1* | 6/2017 | Mori | ...................... | B01D 71/36 |
| 2018/0020273 A1* | 1/2018 | Li | ............................ | H04R 1/02 |
| 2018/0041018 A1* | 2/2018 | Thompson | ........... | H02G 15/003 |

FOREIGN PATENT DOCUMENTS

JP 2015061190 A 3/2015

* cited by examiner

*Primary Examiner* — Hoa C Nguyen
*Assistant Examiner* — Christopher L Augustin
(74) *Attorney, Agent, or Firm* — Duane Morris LLP

(57) ABSTRACT

An electronic device includes an acoustic component, a first housing component including the acoustic component in the inside and including a cut in a first surface located on an outer side, the cut allowing passage of sound toward the acoustic component or sound emitted from the acoustic component, and a second housing component which is removably attached to a side of the first surface of the first housing component and includes a projection introduced in the cut in a second surface opposed to the first surface. An elastic material is located to close at least a part between an inner surface of the cut and a surface of the projection.

7 Claims, 15 Drawing Sheets

ELECTRONIC DEVICE

CROSS-REFERENCE TO RELATED APPLICATION

The present application claims priority under 35 U.S.C. § 119 to Japanese Patent Application No. 2016-165719 filed on Aug. 26, 2016, entitled "Electronic Device." The content of which is incorporated by reference herein in its entirety.

FIELD

The present disclosure relates to an electronic device.

BACKGROUND

An electronic device includes a portable terminal. A portable terminal including a through hole for passage of voice and sound in a housing has been known.

SUMMARY

An electronic device based on the present disclosure includes an acoustic component, a first housing component including the acoustic component in the inside and including a cut in a first surface located on an outer side, the cut allowing passage of sound toward the acoustic component or sound emitted from the acoustic component, and a second housing component which is removably attached to a side of the first surface of the first housing component and includes a projection introduced in the cut in a second surface opposed to the first surface. An elastic material is located to close at least a part between an inner surface of the cut and a surface of the projection.

The foregoing and other objects, features, aspects and advantages of the present disclosure will become more apparent from the following detailed description of the present disclosure when taken in conjunction with the accompanying drawings.

DETAILED DESCRIPTION

Figure 1:
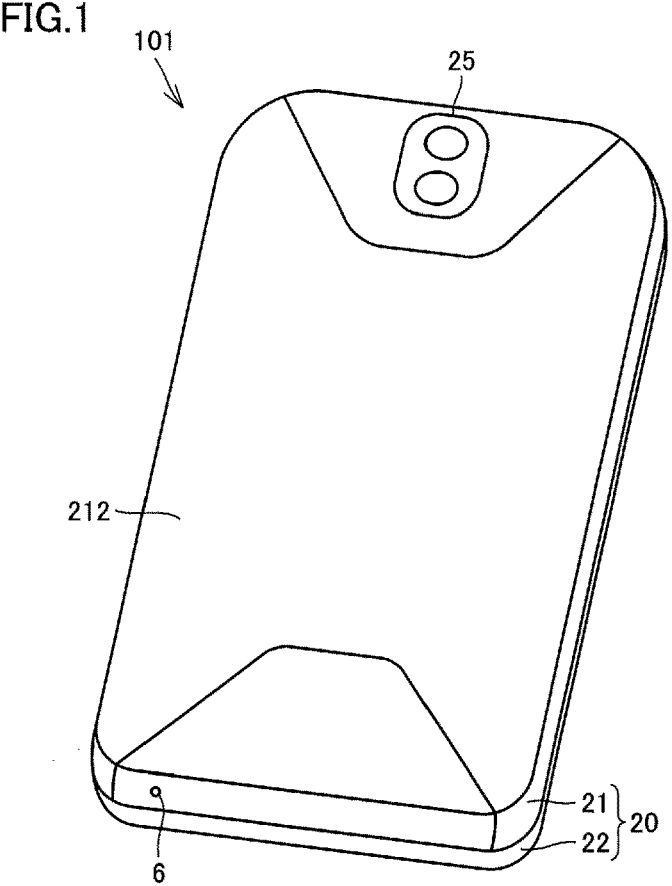
FIG. 1 is a perspective view of an electronic device in a first embodiment based on the present disclosure.

A dimensional ratio shown in the drawings does not necessarily faithfully represent an actual dimensional ratio and a dimensional ratio may be exaggerated for the sake of convenience of description. A concept up or upper or down or lower mentioned in the description below does not mean absolute up or upper or down or lower but may mean relative up or upper or down or lower in terms of a shown position.

(First Embodiment)

An electronic device in a first embodiment based on the present disclosure will be described with reference to FIGS. 1 to 17. FIG. 1 shows appearance of the electronic device in the first embodiment. Though description of the electronic device is given here with a smartphone being defined as the electronic device by way of example, a type of the electronic device is not limited to the smartphone.

Though an electronic device 101 may include a display, FIG. 1 shows a surface opposite to a side where the display of electronic device 101 is located. Electronic device 101 includes a housing 20. An outer geometry of housing 20 is, for example, substantially rectangular. Housing 20 includes a housing component 21 on a rear surface side and a housing component 22 on a front surface side. Housing component 22 may include an opening for a display and a button. FIG. 1 mainly shows housing component 21 on the rear surface side. Electronic device 101 includes, for example, an image pick-up portion 25. Image pick-up portion 25 includes, for example, a camera and a sensor. Housing component 21 includes a first opening 6. In the example shown in FIG. 1, first opening 6 is located in a side surface on a short side of housing component 21.

Figure 2:
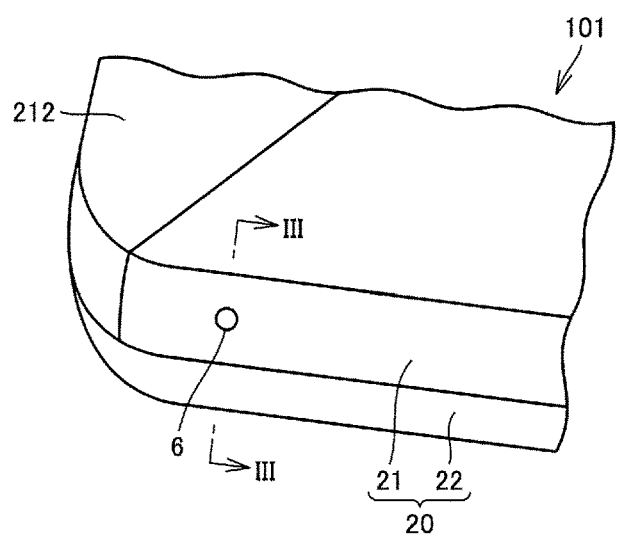
FIG. 2 is a partially enlarged perspective view of a vicinity of a first opening located in the electronic device in the first embodiment based on the present disclosure.
Figure 3:
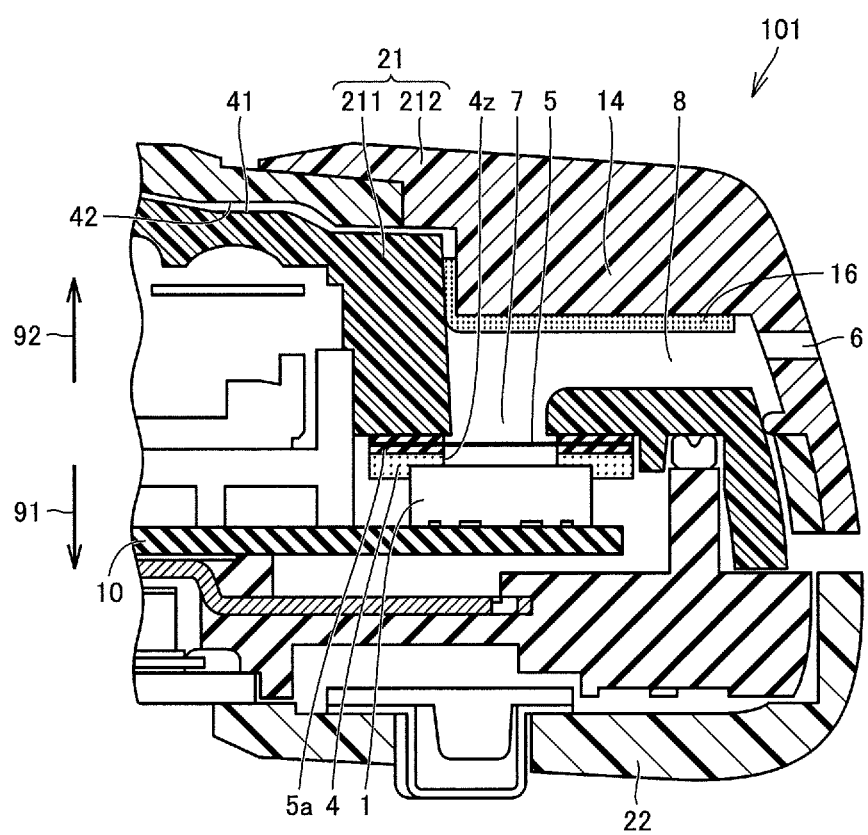
FIG. 3 is a cross-sectional view along the line in FIG. 2.

FIG. 2 shows an enlarged view of a vicinity of first opening 6 in electronic device 101 shown in FIG. 1. FIG. 3 shows a cross-sectional view along the line in FIG. 2.

Housing component 21 includes a first housing component 211 and a second housing component 212. In the example shown here, second housing component 212 is formed through two-color molding. An acoustic component 1 mounted on a substrate 10 is located in a space surrounded by housing component 21 and housing component 22, and acoustic component 1 includes, for example, a microphone. The entire acoustic component 1 may be a microphone. Acoustic component 1 is, for example, columnar. In the example shown here, acoustic component 1 is pressed against an annular elastic member 4. When acoustic component 1 is columnar, for example, a circular annular member is employed for elastic member 4. Elastic member 4 has a circular outer geometry and includes a circular through hole 4z in the center. A waterproof film 5 held by a waterproof film holding portion 5a is located on elastic member 4. Waterproof film 5 is a film permeable to air and also to vibration of air but impermeable to water. Waterproof film 5 can be made with a known technique. Elastic member 4 and waterproof film holding portion 5a are layered to form a layered body. In the example shown here, elastic member 4 is substantially equal in outer diameter to waterproof film holding portion 5a. Elastic member 4 is substantially equal in inner diameter to waterproof film holding portion 5a. An internal space in through hole 4z in elastic member 4 is a space adjacent to a central portion of acoustic component 1.

As shown in FIG. 3, electronic device 101 in the first embodiment includes acoustic component 1, first housing component 211, and second housing component 212. Acoustic component 1 is located in the inside of first housing component 211. First housing component 211 includes a first surface 41 on an outer side. First housing component 211 includes a cut 12 in first surface 41, the cut allowing passage of sound toward acoustic component 1 or sound emitted from acoustic component 1. Second housing component 212 is removably attached to a side of first surface 41 of first housing component 211. Second housing component 212 includes a projection 14 introduced in cut 12, in a second surface 42 opposed to first surface 41. An elastic material 16 is located to close at least a part between an inner surface of cut 12 and a surface of projection 14.

Detailed description is given again below. As shown in FIG. 3, electronic device 101 in the first embodiment includes first housing component 211 including a first through hole which connects a first side 91 and a second side 92 to each other, second housing component 212 removably attached to second side 92 of first housing component 211, and acoustic component 1 located on first side 91 of a first through hole 7. First housing component 211 and second housing component 212 are combined to define a passage 8 which leads from an end on second side 92 of first through hole 7 to the outside. First housing component 211 includes first surface 41 which faces on second side 92. Second housing component 212 includes second surface 42 opposed to first surface 41.

Figure 4:
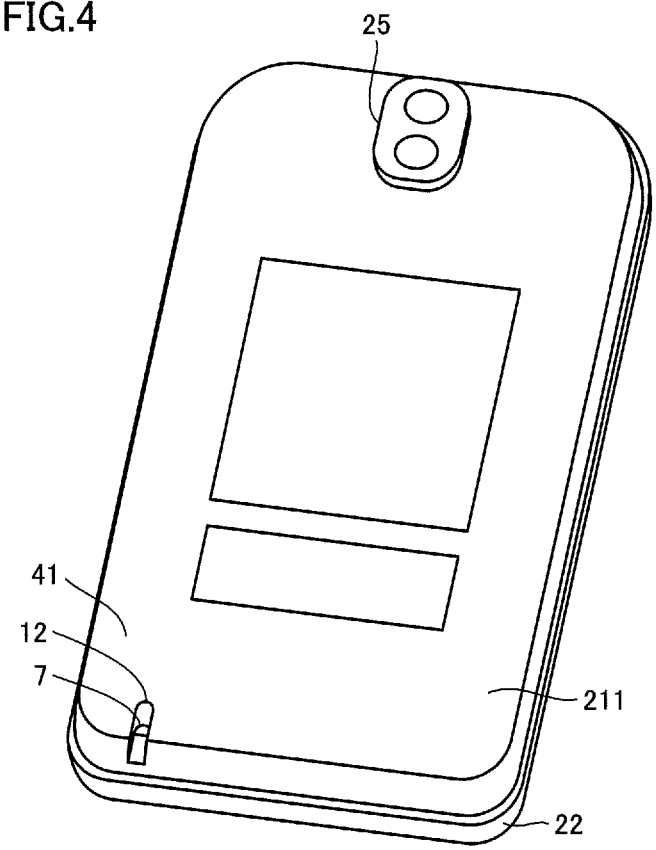
FIG. 4 is a perspective view of the electronic device shown in FIG. 1 from which a second housing component has been removed.
Figure 5:
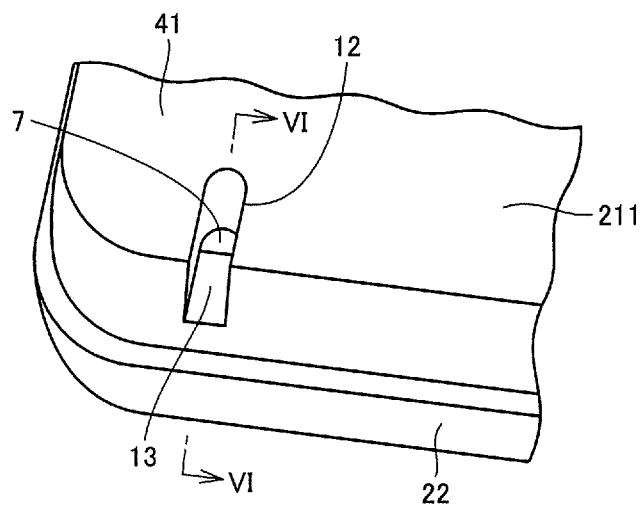
FIG. 5 is a partially enlarged perspective view of a vicinity of a cut in the electronic device in the first embodiment based on the present disclosure.

FIG. 4 shows electronic device 101 shown in FIG. 1 from which second housing component 212 has been removed. In FIG. 4, first housing component 211 is seen with second housing component 212 having been removed. First surface 41 of first housing component 211 is seen. As shown in FIG. 4, first surface 41 includes cut 12. First through hole 7 is located in the inside of cut 12. FIG. 5 shows an enlarged view of a vicinity of cut 12 shown in FIG. 4. A groove 13 is located in cut 12. First housing component 211 includes groove 13. First through hole 7 opens at an end point in a bottom surface of groove 13.

Figure 6:
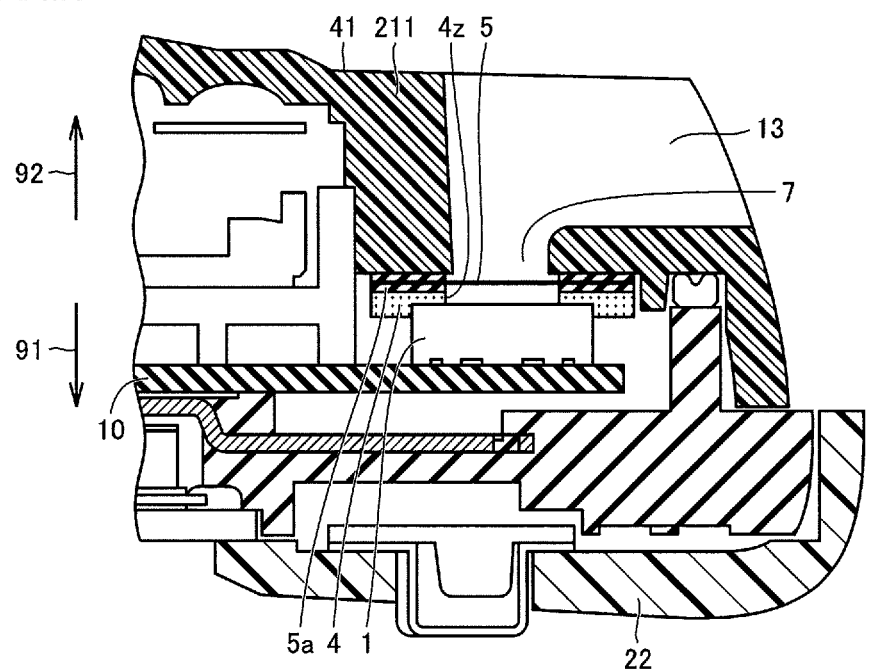
FIG. 6 is a cross-sectional view along the line VI-VI in FIG. 5.
Figure 7:
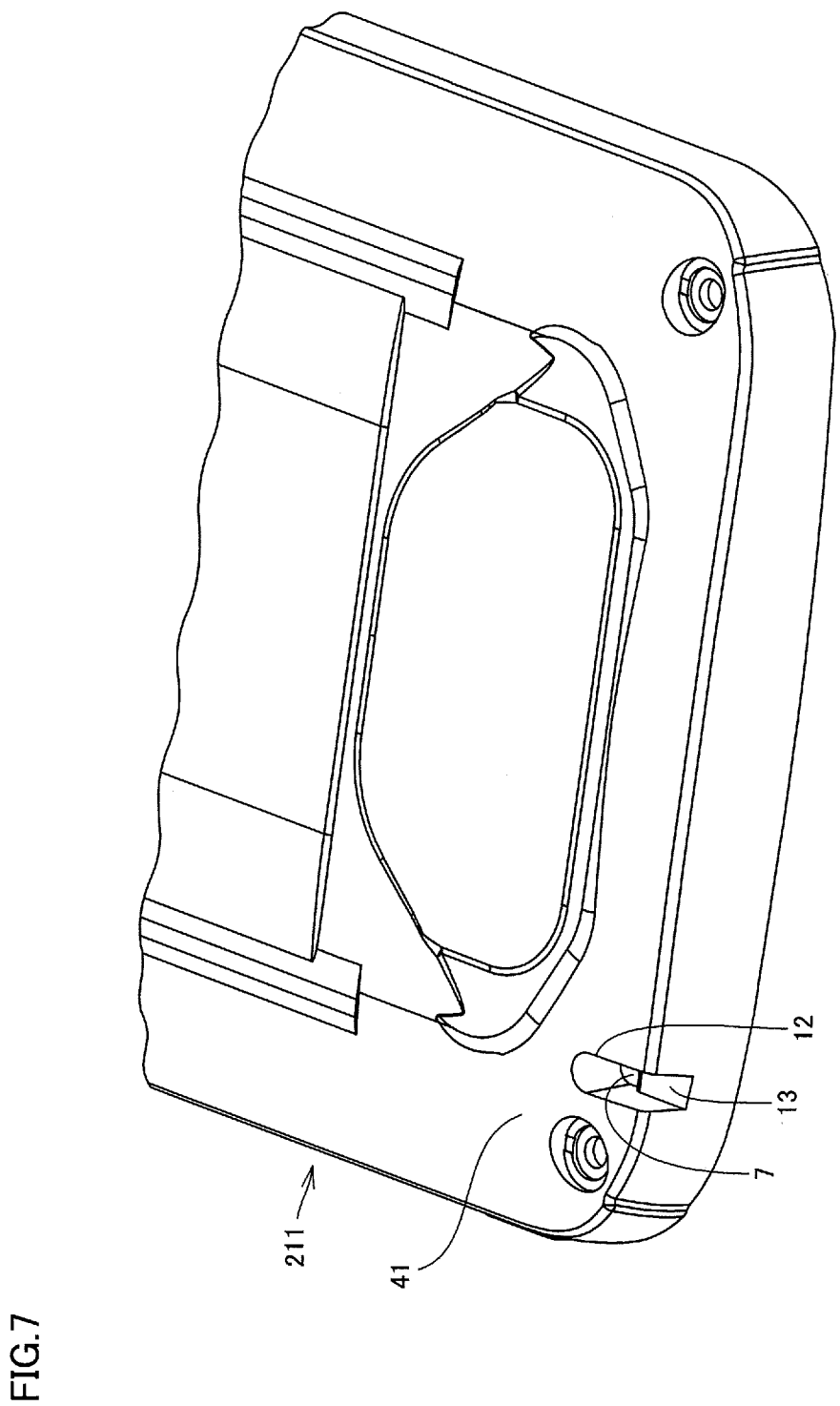
FIG. 7 is a partial perspective view of the first housing component included in the electronic device in the first embodiment based on the present disclosure, the first housing component being taken out alone and viewed in a first direction.
Figure 8:
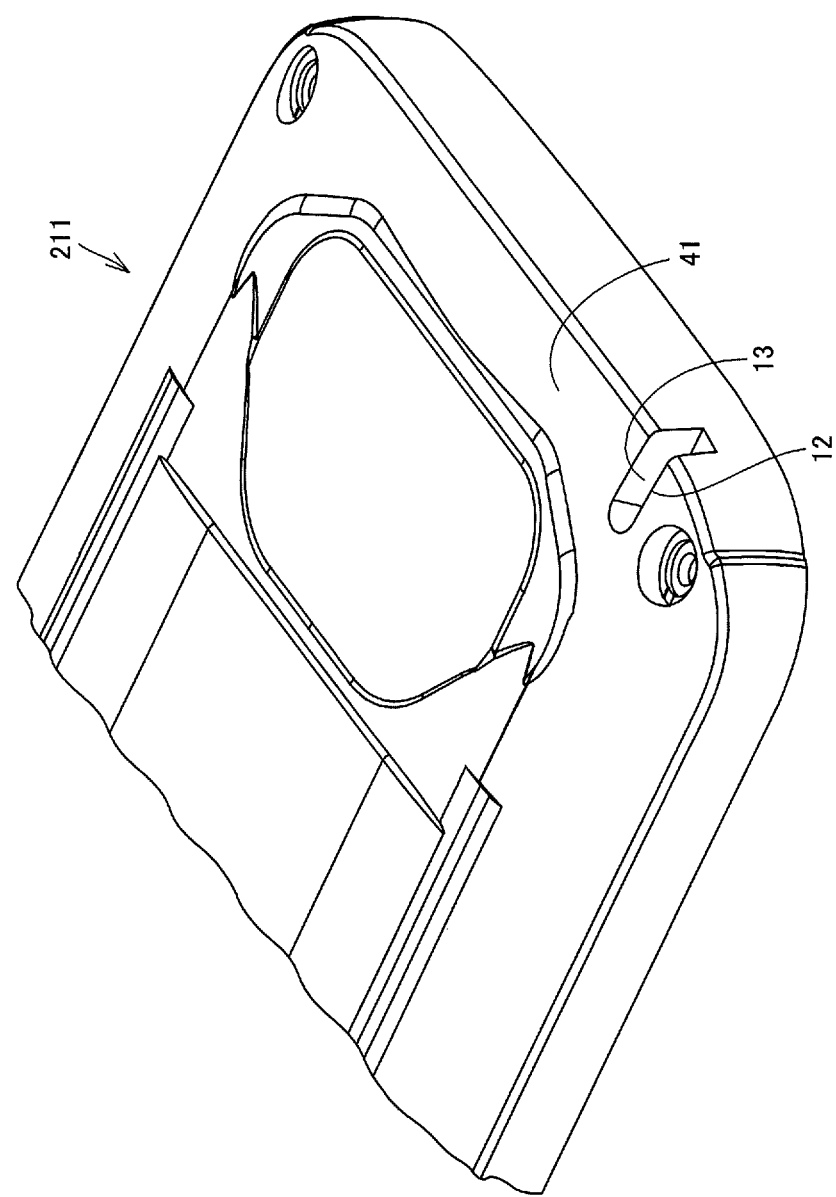
FIG. 8 is a partial perspective view of the first housing component included in the electronic device in the first embodiment based on the present disclosure, the first housing component being taken out alone and viewed in a second direction.

FIG. 6 shows a cross-sectional view along the line VI-VI in FIG. 5. FIG. 7 shows first housing component 211 taken out alone. FIG. 8 shows first housing component 211 when viewed in a direction different from the direction in FIG. 7. First surface 41 of first housing component 211 is seen in FIGS. 7 and 8, and there may be some projections and recesses in first surface 41 as shown in FIGS. 7 and 8. First surface 41 is not necessarily a fully flat surface.

Figure 9:
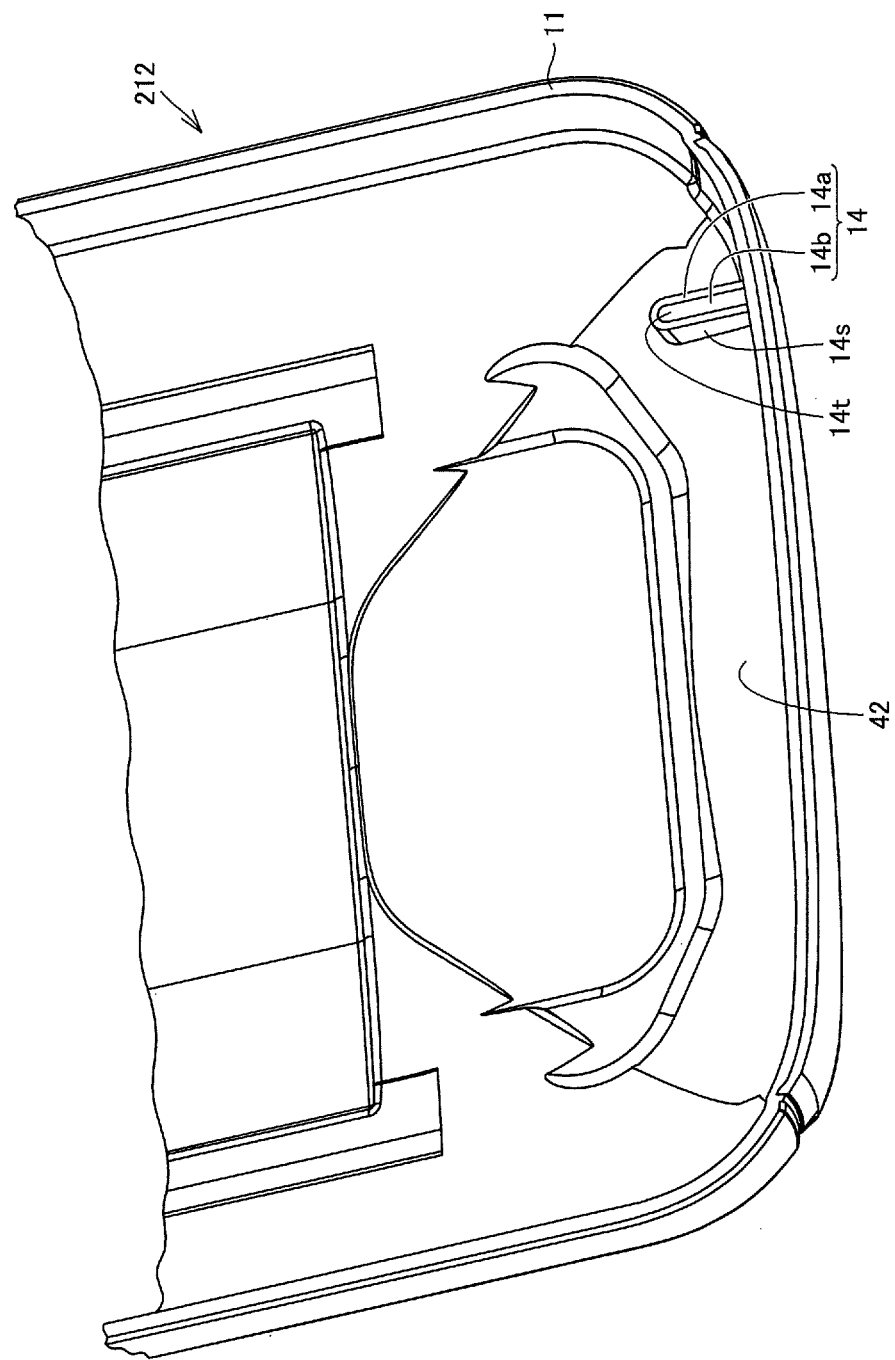
FIG. 9 is a partial perspective view of a rear side of the second housing component included in the electronic device in the first embodiment based on the present disclosure, the second housing component being taken out alone and viewed in a first direction.
Figure 10:
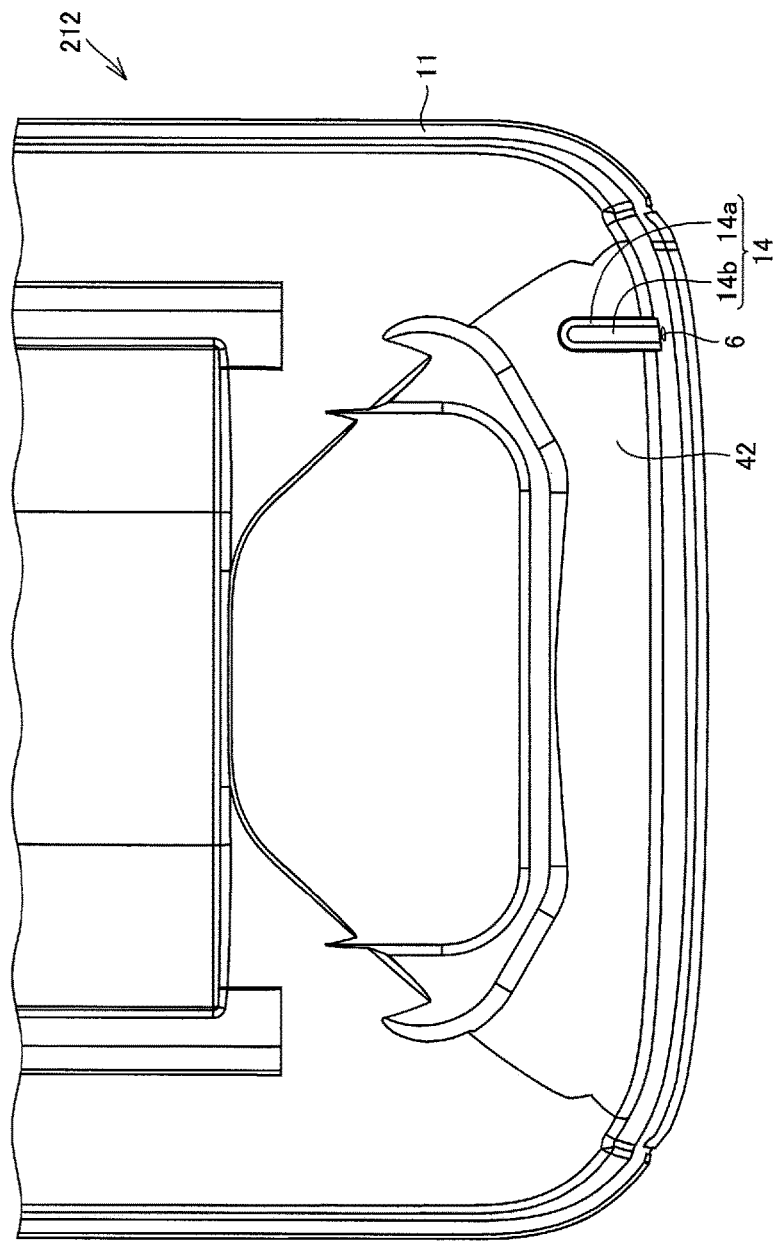
FIG. 10 is a partial plan view of the rear side of the second housing component included in the electronic device in the first embodiment based on the present disclosure, the second housing component being taken out alone and viewed in a perpendicular direction.
Figure 11:
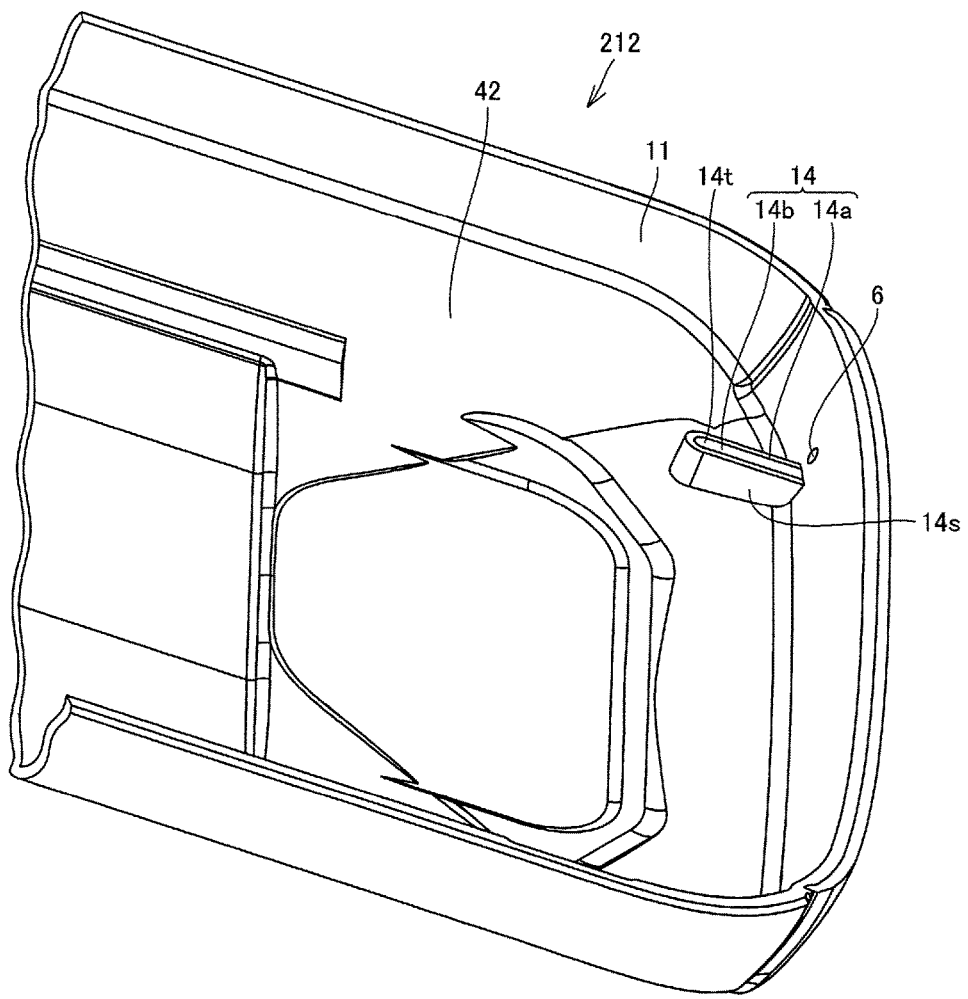
FIG. 11 is a partial perspective view of the rear side of the second housing component included in the electronic device in the first embodiment based on the present disclosure, the second housing component being taken out alone and viewed in a second direction.

FIG. 9 shows a rear side of second housing component 212 included in electronic device 101 as being taken out alone. Second surface 42 is located as being surrounded by a sidewall portion 11. Projection 14 projects from second surface 42. Projection 14 continues to sidewall portion 11. Projection 14 is a part of second housing component 212, FIG. 10 shows the rear side of second housing component 212 viewed in a perpendicular direction. FIG. 11 shows second housing component 212 when viewed in a further different direction. First opening 6 is located in sidewall portion 11. Projection 14 extends substantially perpendicularly from sidewall portion 11.

As shown in FIGS. 9 to 11, second housing component 212 includes projection 14 introduced in cut 12 from second surface 42. Projection 14 includes a top surface 14t and a side surface 14s. In the example shown here, projection 14 is formed of combination of two types of materials. Projection 14 includes a first material portion 14a and a second material portion 14b. Projection 14 may be formed of combination of three or more types of materials. Projection 14 may be formed of a single material. As shown in FIG. 3, elastic material 16 is located to close at least a part between the inner surface of cut 12 and the surface of projection 14.

Figure 12:
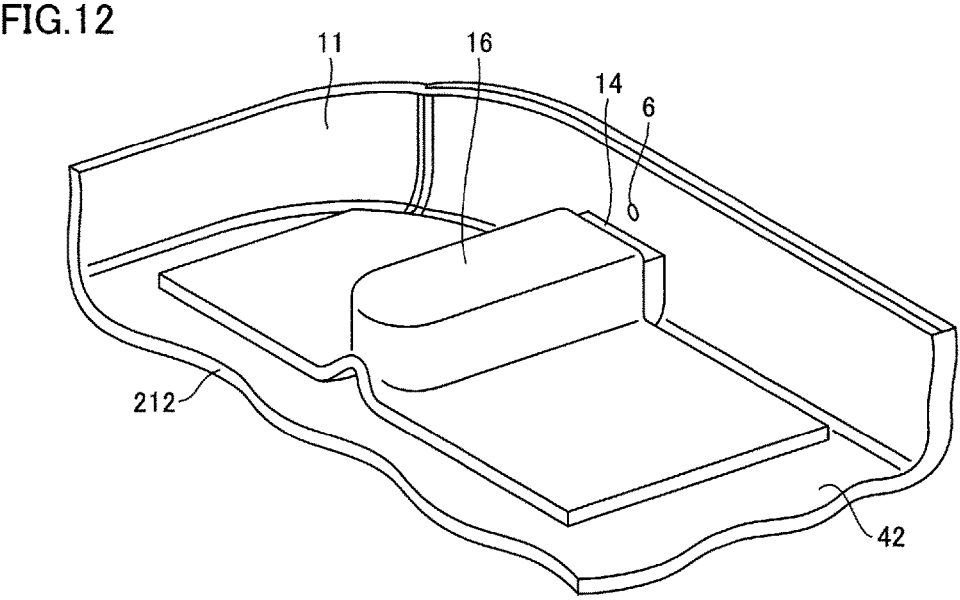
FIG. 12 is a perspective view of a vicinity of a projection with an elastic material being stuck to the second housing component of the electronic device in the first embodiment based on the present disclosure.
Figure 13:
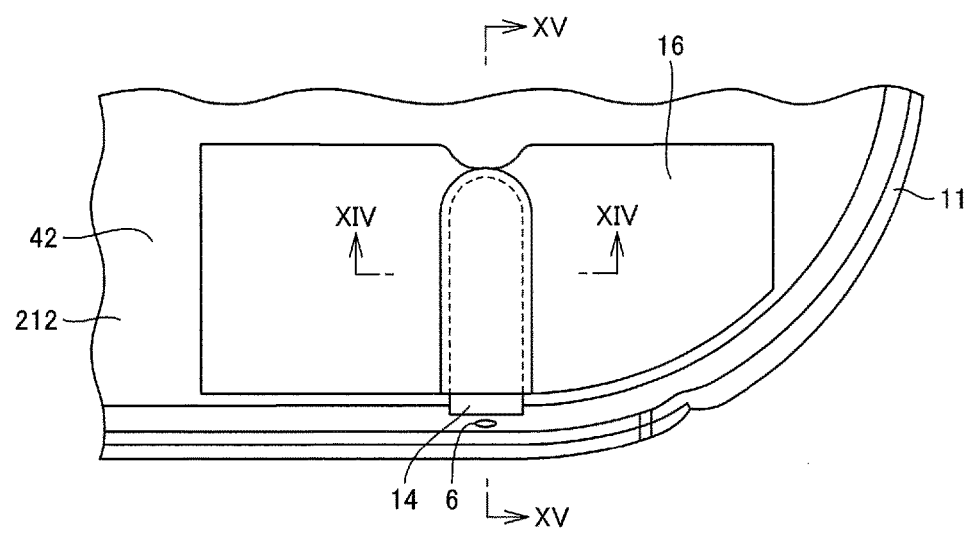
FIG. 13 is a plan view of the vicinity of the projection with the elastic material being stuck to the second housing component of the electronic device in the first embodiment based on the present disclosure.
Figure 14:
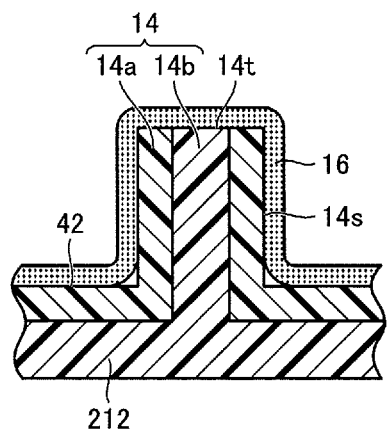
FIG. 14 is a cross-sectional view along the line XIV-XIV in FIG. 13.
Figure 15:
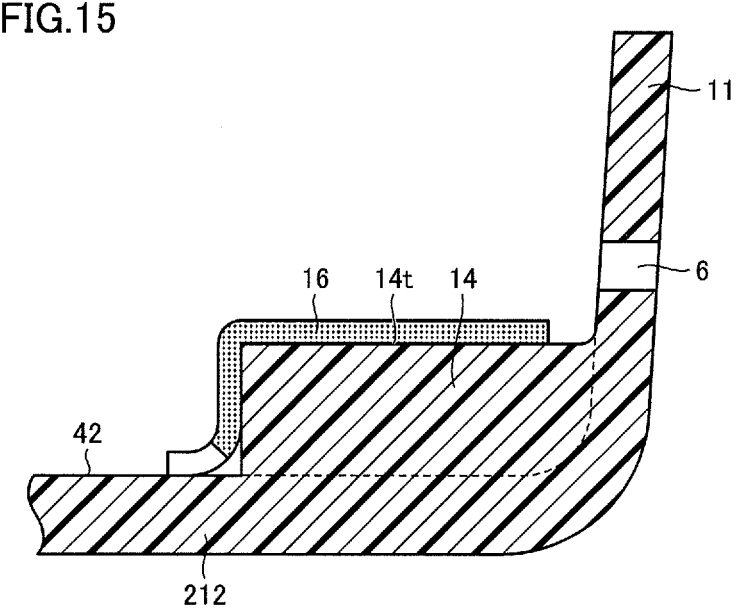
FIG. 15 is a cross-sectional view along the line XV-XV in FIG. 13.

FIG. 12 shows a perspective view of a vicinity of projection 14 with elastic material 16 being stuck to second housing component 212. FIG. 13 shows a plan view of the vicinity of projection 14. FIG. 14 shows a cross-sectional view along the line XIV-XIV in FIG. 13. FIG. 15 shows a cross-sectional view along the line XV-XV in FIG. 13. As shown in FIGS. 12, 13, and 15, a part of projection 14 may be exposed without being covered with elastic material 16. In the example shown in FIGS. 12 and 13, a part of projection 14 in the vicinity of sidewall portion 11 is exposed without being covered with elastic material 16. Elastic material 16 may cover projection 14 as far as a position where projection 14 reaches sidewall portion 11. Elastic material 16 may cover a part of sidewall portion 11, in addition to covering only the surface of projection 14.

Figure 16:
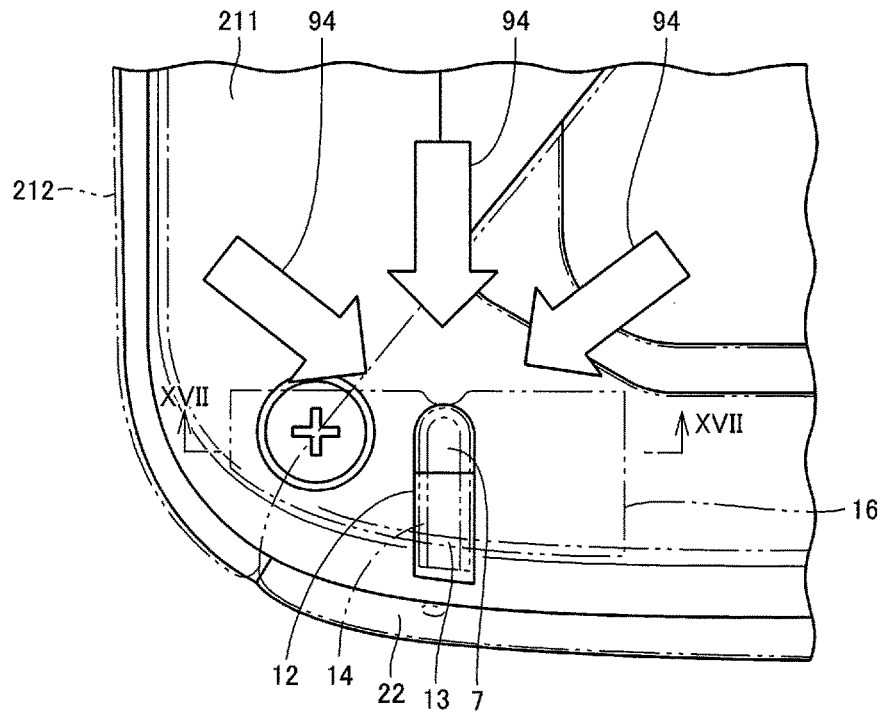
FIG. 16 is an illustrative diagram of travel of sound in the vicinity of the cut in the first housing component of the electronic device in the first embodiment based on the present disclosure.
Figure 17:
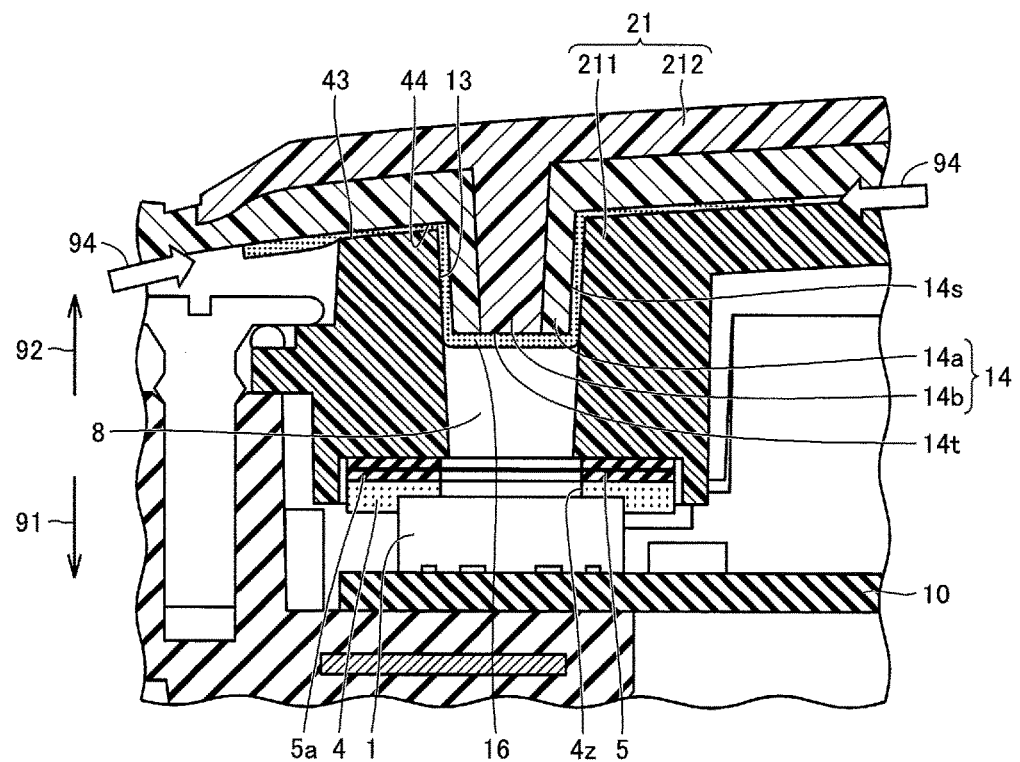
FIG. 17 is a cross-sectional view along the line XVII-XVII in FIG. 16.

FIG. 16 shows a vicinity of cut 12 in first housing component 211 in a plan view. FIG. 16 shows elastic material 16 and second housing component 212 located in front of first housing component 211 with a chain double dotted line. FIG. 17 shows a cross-sectional view along the line XVII-XVII in FIG. 16.

In the first embodiment, at least a part between the inner surface of cut 12 located in first surface 41, that is, the inner surface of groove 13, and the surface of projection 14 is closed by elastic material 16. Therefore, a degree of transmission of sound emitted in any portion in the housing through a gap between components in the housing to acoustic component 1 can be lowered.

The sound emitted in any portion in the housing travels as shown with an arrow 94 in FIG. 16. A small gap between projection 14 and the inner surface of groove 13 is seen in FIG. 16. Most of this gap, however, is closed by elastic material 16. Therefore, a degree of transmission of sound to acoustic component 1 located in the rear of first through hole 7 is lowered. As shown in FIG. 17, elastic material 16 closes a gap between side surface 14s of projection 14 and the inner surface of groove 13.

As shown in the first embodiment, elastic material 16 may be in a form of a sheet. When elastic material 16 is in a form of a sheet, an electronic component can be assembled by sandwiching elastic material 16 in a form of a sheet between first housing component 211 and second housing component 212 or by sticking elastic material 16 in a form of a sheet to any one of first housing component 211 and second housing component 212, so that an assembly operation is facilitated.

As shown in the first embodiment, elastic material 16 may be stuck to second housing component 212. By adopting this construction, a position of elastic material 16 relative to second housing component 212 can be fixed in advance and an electronic component can precisely be assembled. By adopting this construction, second housing component 212 and elastic material 16 can be handled as being integrated in advance, and hence an assembly operation is facilitated.

As shown in the first embodiment, projection 14 includes top surface 14t and side surface 14s and elastic material 16 is in contact with side surface 14s. Elastic material 16 may lie across top surface 14t and side surface 14s. Elastic material 16 does not necessarily cover the entire side surface 14s.

As shown in the first embodiment, at least a part of elastic material 16 may be in contact with both of first surface 41 and second surface 42. By adopting this construction, as shown in FIG. 17, elastic material 16 closes a gap between first surface 41 and second surface 42 also outside groove 13. Therefore, most of sound which travels between first surface 41 and second surface 42 can be cut off before the sound enters groove 13. Therefore, a degree of transmission of sound through a gap between components in the housing to acoustic component 1 can further be lowered.

As shown in FIG. 3, second housing component 212 includes first opening 6 which opens to the outside and sound toward acoustic component 1 can enter the inside of cut 12 from the outside through first opening 6 or sound emitted from acoustic component 1 can go out of the inside of cut 12 through first opening 6 to the outside. In other words, second housing component 212 includes first opening 6 which opens to the outside and passage 8 may lead to the outside through first opening 6. By adopting this construction, passage 8 can lead to the outside at a desired position in second housing component 212. Rather than second housing component 212 alone including an opening, first housing component 211 and second housing component 212 may be combined to define an exit of passage 8 at a boundary between first housing component 211 and second housing component 212. In order to obtain such an exit, for example, a prescribed opening may be made by making a cut in at least any one of first housing component 211 and second housing component 212 and combining one housing with the other.

(Second Embodiment)

The electronic device in a second embodiment based on the present disclosure will be described with reference to FIG. 18. The electronic device in the second embodiment is basically similar in construction to the electronic device described in the first embodiment. The electronic device in the second embodiment includes an elastic material 16i instead of elastic material 16.

Figure 18:
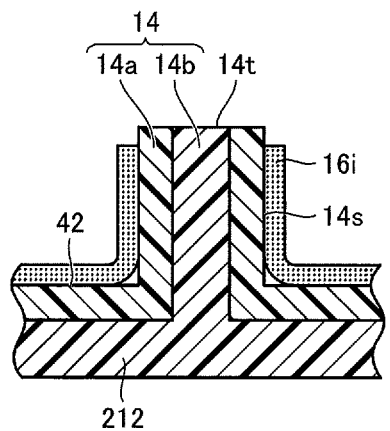
FIG. 18 is a cross-sectional view of the vicinity of the projection with an elastic material being stuck to the second housing component of the electronic device in a second embodiment based on the present disclosure.

FIG. 18 shows a cross-sectional view of the vicinity of projection 14 of the electronic device in the second embodiment. Elastic material 16i is located to cover side surface 14s of projection 14. Top surface 14t of projection 14 is not covered with elastic material 16i.

The construction as shown in the second embodiment can also obtain the effect the same as in the first embodiment.

(Third Embodiment)

Figure 19:
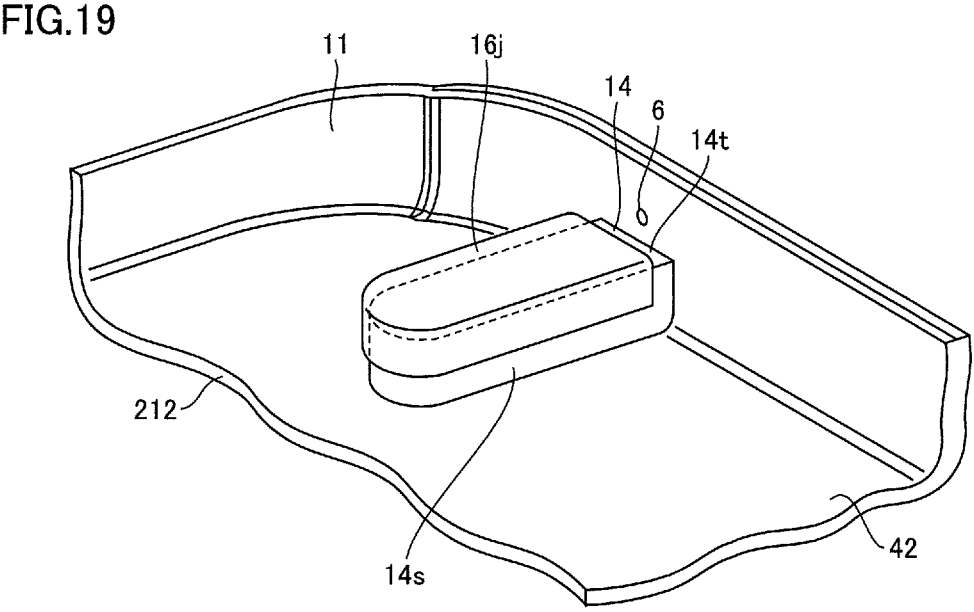
FIG. 19 is a perspective view of the vicinity of the projection with an elastic material being stuck to the second housing component of the electronic device in a third embodiment based on the present disclosure.

The electronic device in a third embodiment based on the present disclosure will be described with reference to FIGS. 19 and 20. The electronic device in the third embodiment is basically similar in construction to the electronic device described in the first embodiment. The electronic device in the third embodiment includes an elastic material 16j instead of elastic material 16.

Figure 20:
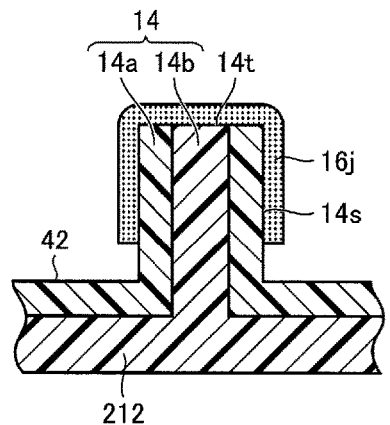
FIG. 20 is a cross-sectional view of the vicinity of the projection with the elastic material being stuck to the second housing component of the electronic device in the third embodiment based on the present disclosure.

FIG. 20 shows a cross-sectional view of the vicinity of projection 14 of the electronic device in the third embodiment. Elastic material 16j is located to cover a most part of top surface 14t of projection 14 and further a part of side surface 14s. Elastic material 16j may cover a lower end of side surface 14s. As shown in FIG. 20, a part of side surface 14s may be exposed.

Though elastic material 16j may be obtained by bending a member in a form of a sheet into a shape as shown, it may be made of a member like a gasket initially in such a three-dimensional shape.

The construction as shown in the third embodiment can also obtain the effect the same as in the first embodiment.

(Fourth Embodiment)

Figure 21:
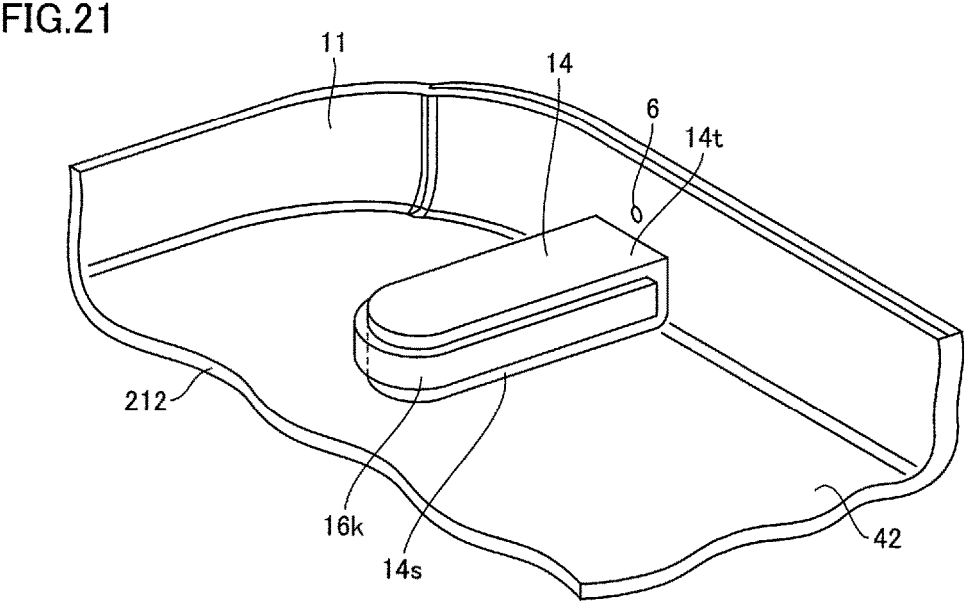
FIG. 21 is a perspective view of the vicinity of the projection with an elastic material being stuck to the second housing component of the electronic device in a fourth embodiment based on the present disclosure.

The electronic device in a fourth embodiment based on the present disclosure will be described with reference to FIGS. 21 and 22. The electronic device in the fourth embodiment is basically similar in construction to the electronic device described in the first embodiment. The electronic device in the fourth embodiment includes an elastic material 16k instead of elastic material 16.

Figure 22:
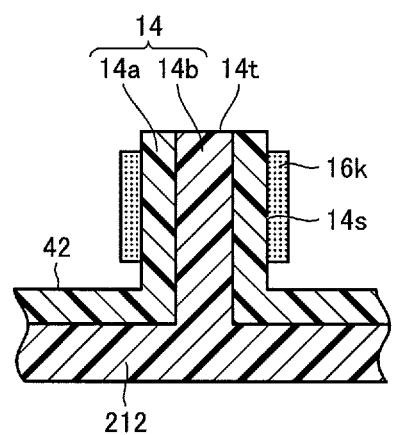
FIG. 22 is a cross-sectional view of the vicinity of the projection with the elastic material being stuck to the second housing component of the electronic device in the fourth embodiment based on the present disclosure.

FIG. 22 shows a cross-sectional view of the vicinity of projection 14 of the electronic device in the fourth embodiment. Elastic material 16k does not cover top surface 14t of projection 14. Elastic material 16k is located to cover a part of side surface 14s. Elastic material 16k does not have to cover the lower end of side surface 14s. Elastic material 16k does not have to cover an upper end of side surface 14s.

Though elastic material 16k may be obtained by bending a member in a form of a sheet into a shape as shown, it may be made of a member like a gasket initially in such a three-dimensional shape.

The construction as shown in the fourth embodiment can also obtain the effect the same as in the first embodiment.

In any of the first to fourth embodiments, acoustic component 1 preferably includes a microphone. Since the microphone is an apparatus which collects voice and sound, an effect is particularly noticeable when acoustic component 1 includes a microphone.

A structure shown in the first to fourth embodiments is not limited to the electronic device including waterproof film 5 as described in the first embodiment. For example, acoustic component 1 may be located as being directly exposed through first through hole 7, without including waterproof film 5.

As described in the first embodiment, first housing component 211 may include first through hole 7 which connects the inside and cut 12 to each other and waterproof film 5 may be located between first through hole 7 and acoustic component 1. By adopting this construction, even when the electronic device is wetted with water, acoustic component 1 is less likely to be in contact with water.

The elastic material shown in the first to fourth embodiments may be composed of a resin. The resin here may be, for example, a urethane resin or silicone rubber.

The elastic material shown in the first to fourth embodiments may be composed of a foamed material. The foamed material here may be, for example, a foamed urethane resin.

Some features in an embodiment above may be adopted as being combined as appropriate. Though description has been given so far by using the term "electronic device," the electronic device is a broad concept covering, for example, a portable telephone, a portable information terminal, a tablet terminal, a personal computer, a game console, a television receiver, a portable music player, a compact disc (CD) player, a digital versatile disc (DVD) player, an electronic calculator, an electronic organizer, an electronic dictionary, an electronic book reader, a digital camera, a video camera, a radio receiver, a navigation system, and a measurement instrument. The concept of the portable telephone or the portable information terminal includes a smartphone.

Though an embodiment of the present disclosure has been described, it should be understood that the embodiment disclosed herein is illustrative and non-restrictive in every respect. The scope of the present disclosure is defined by the terms of the claims and is intended to include any changes within the scope and meaning equivalent to the terms of the claims.

The invention claimed is:

1. An electronic device comprising:
    an acoustic component;
    a first housing component including the acoustic component inside and including a cut in a first surface located on an outer side, the cut allowing passage of sound toward the acoustic component or sound emitted from the acoustic component;
    a second housing component which is removably attached to a side of the first surface of the first housing component and includes a projection introduced in the cut in a second surface opposed to the first surface; and
    an elastic material being located to close at least a part between an inner surface of the cut and a surface of the projection, wherein the second housing component includes a first opening which opens toward outside, and sound toward the acoustic component can enter inside of the cut from the outside through the first opening or the sound emitted from the acoustic component can go out of the inside of the cut through the first opening to the outside.

2. The electronic device according to claim 1, wherein the elastic material is in a form of a sheet.

3. The electronic device according to claim 2, wherein the elastic material is stuck to the second housing component.

4. The electronic device according to claim 1, wherein the projection includes a top surface and a side surface, and the elastic material is in contact with the side surface.

5. The electronic device according to claim 1, wherein at least a part of the elastic material is in contact with both of the first surface and the second surface.

6. The electronic device according to claim 1, wherein the first housing component includes a first through hole which connects the inside and the cut, and a waterproof film is located between the first through hole and the acoustic component.

7. An electronic device comprising:
    an acoustic component;
    a first housing component including the acoustic component inside and including a cut in a first surface located on an outer side, the cut allowing passage of sound toward the acoustic component or sound emitted from the acoustic component;
    a second housing component which is removably attached to a side of the first surface of the first housing component and includes a projection introduced in the cut in a second surface opposed to the first surface; and
    an elastic material being located to close at least a part between an inner surface of the cut and a surface of the projection, wherein at least a part of the elastic material is in contact with both of the first surface and the second surface.

* * * * *